United States Patent
Mori

Patent Number: 4,884,607
Date of Patent: Dec. 5, 1989

[54] PNEUMATIC TIRE TREAD PATTERN WITH LATERAL GROOVES HAVING INCREASING GROOVE ANGLE TOWARDS SHOULDERS

[75] Inventor: Shinichi Mori, Hiratsuka, Japan

[73] Assignee: The Yokohama Rubber Co., Ltd., Tokyo, Japan

[21] Appl. No.: 200,875

[22] Filed: Jun. 1, 1988

[30] Foreign Application Priority Data

Jun. 3, 1987 [JP] Japan .................. 62-138182

[51] Int. Cl.$^4$ ............................................. B60C 11/04
[52] U.S. Cl. ............................................... 152/209 R
[58] Field of Search .......... 152/209 A, 209 D, 209 A, 152/209 B, DIG. 3

[56] References Cited

U.S. PATENT DOCUMENTS

| | | | |
|---|---|---|---|
| 3,584,670 | 6/1971 | Verdier | 152/209 R |
| 3,674,077 | 7/1972 | Verdier | 152/209 R |
| 4,057,089 | 11/1977 | Johannsen | 152/209 R |
| 4,284,115 | 8/1981 | Ohnishi | 152/209 R |
| 4,299,264 | 11/1981 | Williams | 152/209 R |

FOREIGN PATENT DOCUMENTS 561 1/1978 Japan .

*Primary Examiner*—Michael W. Ball
*Assistant Examiner*—Geoffrey L. Knable
*Attorney, Agent, or Firm*—Armstrong, Nikaido, Marmelstein, Kubovcik & Murray

[57] ABSTRACT

The specification discloses a pneumatic tire provided, on the tread surface thereof, with a plurality of main grooves extending towards the circumferential direction of the tire, a plurality of ribs defined by said main grooves, and a plurality of subgrooves provided on said ribs and traverse to the circumferential direction of the tire, wherein the groove angle of said subgrooves provided on said ribs on the shoulder side of the tire is smaller than that of said subgrooves provided on the ribs on the tread center side of the tire and the cross-sectional area of said subgrooves on said ribs on the shoulders is larger than that of said subgrooves provided on the ribs on the tread center side of the tire. This tire exhibits improved wet performances in, particularly, draining property and preventing hydroplaning while substantially maintaining the performances of the tire such as driving stability, durability, riding comfort, and abrasion resistance.

4 Claims, 1 Drawing Sheet

PNEUMATIC TIRE TREAD PATTERN WITH LATERAL GROOVES HAVING INCREASING GROOVE ANGLE TOWARDS SHOULDERS

BACKGROUND OF THE INVENTION

It has been a usual practice to prevent the occurrence of hydroplaning through an improvement in a draining property of a tire when traveling on a wet road by providing a plurality of main grooves on the tread surface of a tire along the circumferential direction of the tire and, at the same time, providing a number of subgrooves on a rib in a direction traverse to the circumferential direction of the tire to thereby allow the main grooves to communicate with each other.

A gradual increase in the width of the subgroove in going from the tread center region towards the shoulders contributes to an improvement in the draining property of the tire. However, such a tire is poor in other characteristics required in the practical use of a tire, e.g., travelling performances, in e.g., whirling and abrasion resistance and even comes to lose such characteristics, which makes it impossible to put the tire to practical use.

In order to improve the draining property of a tire without sacrificing the driving stability and the abrasion resistance thereof, Japanese Patent Publication No. 53-561 proposes a tire in which the width of the subgrooves is increased in going from the tread center of the tire towards the shoulders thereof and, at the same time, the width and depth of both the subgrooves and the main grooves are specified based on the relationship between the width of the tread and the tread gauge of the tire. In this tire, the draining property can be ensured by an increase in the depth of the grooves provided on the shoulder sections. However, the increase in the depth of the grooves brings about an increase in the movement of the block (or rib) on the shoulder sections, which unfavorably spoils the driving stability during cornering.

SUMMARY OF THE INVENTION

An object of the present invention is to provide a pneumatic tire improved in wet performances, particularly a draining property, while substantially maintaining the performances of the tire required in the practical use thereof, such as driving stability, abrasion resistance (durability) and riding comfort.

DETAILED DESCRIPTION OF THE PREFERRED EMBODIMENTS

The above object of the present invention can be accomplished by a tire provided, on the tread surface thereof, with a plurality of main grooves extending towards the circumferential direction of the tire and a plurality of subgrooves traverse to the circumferential direction of the tire and formed on ribs defined by said main grooves, wherein the groove angle of the subgrooves provided on the ribs on the shoulder side of the tire is smaller than that of the subgrooves provided on the ribs on the tread center side of the tire, i.e., the groove angle of the subgrooves provided on each rib is gradually decreased in going from the tread center region towards the shoulders, while substantially maintaining each of the width and depth of the subgrooves at a constant value, thereby improving the draining property of the tire.

Figure 1:
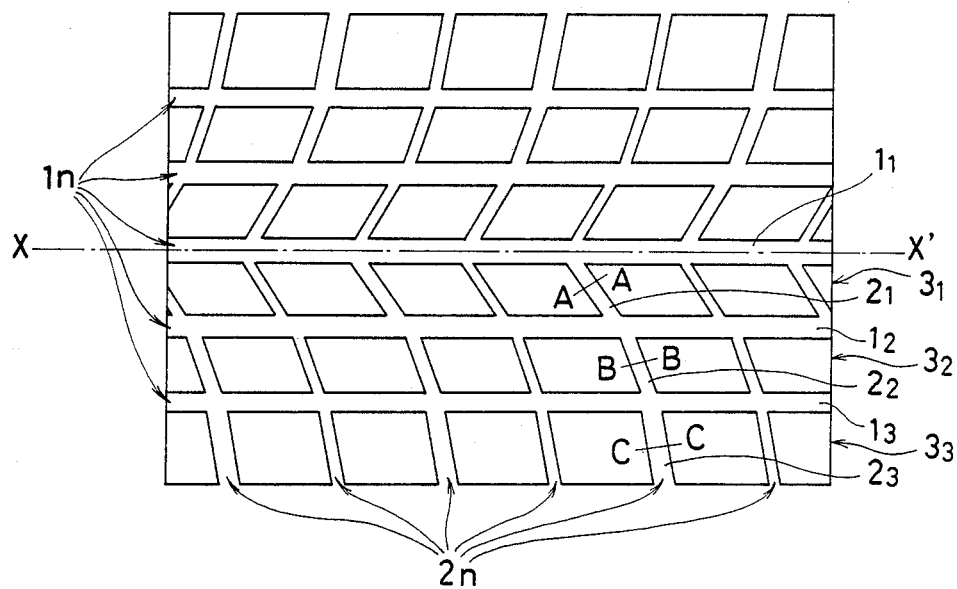
FIG. 1 is a plan view of an example of a tread pattern of a pneumatic tire according to the present invention.

As shown in FIG. 1 and FIGS. 2(A), (B), and (C), in the tire of the present invention, a plurality of main grooves $1_1, 1_2, 1_3, \ldots 1_n$ are provided in parallel with each other along the direction of the equatorial plane X—X' of the tire, i.e., the circumferential direction of the tire, and ribs $3_1, 3_2, 3_3, \ldots 3_n$ defined by a plurality of these main grooves are provided with a plurality of subgrooves $2_1, 2_2, 2_3, \ldots 2_n$ in a direction traverse to the main grooves (circumferential direction) to thereby allow the main grooves to communicate with each other.

In the present invention, with respect to the groove angles, $\alpha_1$, $\alpha_2$ and $\alpha_3$, of the subgrooves $2_n$ provided on the ribs $3_1, 3_2, 3_3, \ldots 3_n$ disposed from the tread center side towards the shoulder side of the tire, it is necessary that the groove angles of the subgrooves on the shoulder side should be successively reduced as compared with the groove angles of the subgrooves provided on the tread center side. That is, it is necessary that the groove angles, $\alpha_1$, $\alpha_2$ and $\alpha_3$, of the subgrooves should satisfy the following relationship:

$$\alpha_1 > \alpha_2 > \alpha_3, \ldots > \alpha_n$$

When the groove angles $\alpha_1, \alpha_2, \alpha_3, \ldots \alpha_n$ of the subgrooves $2_1, 2_2, 2_3, \ldots 2_n$ satisfy the above relationship, it becomes possible to gradually increase the cross-sectional area of the subgroove of each rib in going from the tread center side towards the shoulder side while substantially maintaining the groove width and depth of the subgrooves.

Figure 2:
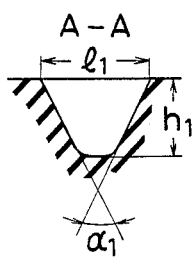
FIGS. 2(A), (B), and (C) are cross-sectional views respectively taken along line A—A, line B—B, and line C—C in a direction traverse to individual subgrooves $2_1, 2_2, 2_3, \ldots (2_n)$ respectively provided on the tire ribs $3_1, 3_2, 3_3, \ldots (3_n)$ shown in FIG. 1, i.e., a cross-sectional view of a subgroove.
Figure 2:
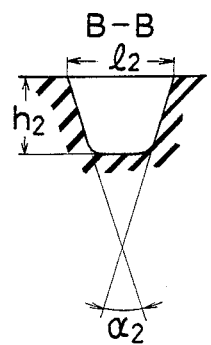
Figure 2:
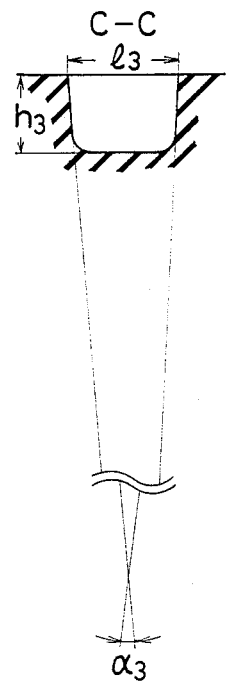

The groove angle of the above-described subgrooves in the present invention is intended to mean, as shown in FIG. 2, an angle at an intersection obtained by extending two tangent lines respectively along the wall surfaces of both sides opposite to each other.

It is preferred that the groove angle, $\alpha_1$, of the subgroove $2_1$ formed on the rib $3_1$ located on the tread center side should be about 20° to about 50°, the groove angle, $\alpha_2$, of the subgroove $2_2$ formed on the rib $3_2$ about 10° to about 35°, the groove angle, $\alpha_3$, of the subgroove $2_3$ formed on the rib $3_3$ located on the side and adjacent to the rib $3_2$ about 20° or less, and the groove angle of the subgroove formed on the rib should be reduced with an increase in the distance of the rib from the above-described tread center region.

Specifically, when the groove angle, $\alpha_1$, of the subgroove $2_1$ formed on the rib $3_1$ located on the tread center side is less than about 20°, the cross-sectional area of the block on the tread surface is reduced. This unfavorably brings about a lowering in the rigidity and a lowering in the gripping performance in the direction of travelling of the tire. On the other hand, when the groove angle $\alpha_1$ exceeds about 50°, it is necessary to increase the width of the groove, which unfavorably brings about a lowering in the rigidity of the block in the tread center region and similarly a lowering in the gripping performance in the direction of travelling of the tire. In order to smoothly eject water stream coming from the tread center region into the outside of the ground-contacting area of the tire, it is necessary that the groove angle, $\alpha_2$, of the subgroove $2_2$ provided on the rib $3_2$ should be about 20° or less. When the angle exceeds about 20°, the cross-sectional area of the groove is reduced, which unfavorably causes a rapid lowering in the draining property of the tire. Further, it is preferred to select the angle $\alpha_2$ so as to satisfy the following relationship: $\alpha_1 > \alpha_2 > \alpha_3$, i.e., so that the angle $\alpha_2$ ranges from about 10° to about 35° and is smaller than the angle $\alpha_1$ and larger than the angle $\alpha_3$.

When the groove widths $l_1, l_2, l_3, \ldots, l_n$ of the subgrooves of these ribs $3_1, 3_2, 3_3, \ldots 3_n$ as measured on the tread surface are substantially identical to each other for the purpose of avoiding a decrease in the ground-contacting area of the tire, the tire further can have excellent performances in, e.g., braking and whirling, particularly whirling in a wet state and resistance to uneven abrasion. Further, it is desired that the groove depths $h_1, h_2, h_3, \ldots, h_n$ of the subgrooves provided on the ribs $3_1, 3_2, 3_3, \ldots 3_n$ should be also substantially identical to each other. Moreover, it is preferred that the widths $l_1, l_2, l_3, \ldots, l_n$ of the subgrooves and the depths $h_1, h_2, h_3, \ldots, h_n$ of the subgrooves should be usually 3 to 7 mm and 3 to 7 mm, respectively, depending upon the groove size of the main grooves.

It is not always necessary that the subgrooves provided on the ribs in a direction traverse to the circumferential direction of the tire should be formed so as to linearly and continuously traverse the ribs in the tread center region and the ribs on the shoulder sides. However, in order to improve the draining property of tire, it is preferred that, as shown in the drawing, the subgrooves each traverse the individual ribs through the main grooves in a distance as short as possible.

There is no particular limitation with respect to the shape and the dimension, such as width, depth and angle, of the main grooves. However, it is preferred that the main grooves should be of a straight groove shape or a shape having a small point height. Further, the groove width and the groove depth are both preferably 4 to 8 mm. It is preferred from the viewpoint of easiness of manufacture of the tire that all the shapes and the dimensions of the main grooves should be identical to each other.

In the present invention, it is not necessary for all of the subgrooves provided on one rib extending towards the circumferential direction of the tire to be identical to each other in the groove angle. However, it is preferred that the subgrooves themselves each have a groove angle which is gradually reduced in going from the tread center side towards the shoulder sides.

The cross-sectional area of the subgrooves of the above-described tire of the present invention is increased in going from the tread center region towards the shoulders which brings about an improvement in the draining property of the tire. Further, since the widths of the subgrooves on the tread surface are substantially identical to each other, the ground-contacting area of the tire, particularly the ground-contacting areas of the shoulder regions are not varied according to the change in the above-described groove angle but maintained at a substantially identical value.

Therefore, the tire of the present invention neither causes a decrease in the ground-contacting area of the shoulder regions thereof nor spoils various characteristics required of the tire in, e.g., braking, whirling particularly in a wetted state and resistance to uneven abrasion, as opposed to the above-described conventional tire, i.e., a tire in which the width of the subgrooves is increased in going from the tread center region towards the shoulders.

Further, since the tire of the present invention is excellent in the draining property, it can exhibit excellent performances when used not only as tires for a passenger car and a light truck but also as tires for use in racing and circuits.

The present invention will now be described in more detail with reference to the following Examples.

In the Examples, the draining property, driving stability, and resistance to uneven abrasion of a tire were evaluated by the following methods.

Draining property and driving stability

A tire having a pneumatic pressure of 1.9 kg/cm² and a size of 185/60 R14 and provided with a rim of 5JJ×14 was mounted on a front engine and rear drive vehicle (hereinafter referred to as "FR vehicle") and the vehicle was allowed to travel on a test course having a water depth of 1 mm to 3 mm to measure the travelling speed, the lateral gravitational force, and the slip rate of the tire.

The driving stability was evaluated based on the feeling of a driver in a travel test on an actual vehicle by making use of the above-described FR vehicle.

Abrasion Resistance

A tire having a pneumatic pressure of 1.9 kg/cm² and a size of 185/60 R14 and provided with a rim of 5JJ×14 was mounted on an FR vehicle for business (taxi), and the vehicle was allowed to travel for a predetermined period of time. Thereafter, the state of abrasion of the tire was observed to evaluate the abrasion resistance.

EXAMPLES AND COMPARATIVE EXAMPLES

There were manufactured tires 1 and 2 of the present invention each having a tire size of 185/60 R14 and provided with main grooves having a groove width of 7 mm and a groove depth of 6 mm and subgrooves having a groove width of 5 mm and a groove depth of 6 mm and having a tread pattern shown in FIG. 1, wherein only the groove angles of the subgrooves are decreased in going from the tread center region towards the shoulders while the widths and depths of the subgrooves are respectively identical to each other, to evaluate the draining property, driving stability, and abrasion resistance.

For comparison, there were manufactured a comparative tire 1 in which the groove angles, groove widths and depths of the subgrooves are respectively identical to each other, a comparative tire 2 in which the groove angles of the subgrooves are decreased in going from the tread center region towards the shoulders and the groove widths of the subgrooves are increased in going from the tread center region towards the shoulders while the depths of the subgrooves are identical to each other, and a comparative tire 3 in which the groove angles of the subgrooves are decreased in going from the tread center region towards the shoulders and the groove depth of the subgrooves are increased in going from the tread center region towards the shoulders while the groove widths of the subgrooves are identical to each other, to conduct evaluation in the same manner as that described above. The results are shown in Table 1.

TABLE 1

|  |  | Ex. |  | Comp. Ex. |  |  |
|---|---|---|---|---|---|---|
|  |  | 1 | 2 | 1 | 2 | 3 |
| groove | $\alpha_1$ | 40 | 25 | 20 | 25 | 25 |
| angle | $\alpha_2$ | 30 | 20 | 20 | 20 | 20 |
|  | $\alpha_3$ | 20 | 15 | 20 | 15 | 15 |
| groove | rib $3_1$ | 40 | 25 | 20 | 3 | 25 |
| width | $3_2$ | 30 | 20 | 20 | 4 | 20 |
|  | $3_3$ | 20 | 15 | 20 | 5 | 15 |
| groove | rib $3_1$ | 40 | 25 | 20 | 3 | 4 |
| depth | $3_2$ | 30 | 20 | 20 | 4 | 5 |
|  | $3_3$ | 20 | 15 | 20 | .5 | 6 |
| draining property |  | 100 | 105 | 100 | 105 | 105 |
| driving stability |  | 109 | 104 | 100 | 97 | 95 |
| abrasion resistance |  | 106 | 103 | 100 | 98 | 96 |

I claim:

1. A pneumatic tire provided, on the tread surface thereof, with a plurality of main grooves extending along the circumferential direction of the tire, a plurality of ribs defined by said main grooves, and a plurality of subgrooves provided on said ribs and traverse to the circumferential direction of the tire such that adjacent main grooves communicate with each other, each said subgroove having a groove angle defined as an angle of intersection between extended tangent lines to the opposite side walls of said subgroove, wherein the groove angle of said subgrooves provided on said ribs on the shoulder side of the tire is smaller than that of said subgrooves provided on the ribs on the center side of the tire and the cross-sectional area of said subgrooves provided on said ribs is increased in going from the tread center side towards the shoulders while maintaining the width and depth of the subgrooves substantially constant.

2. A pneumatic tire according to claim 1, wherein the groove angle ($\alpha_1$) of said subgrooves provided on said ribs on the tread center side is about 20° to about 50° and the groove angles of the subgrooves provided on ribs on the shoulder side of the tire adjacent thereto are successively decreased so as to be about 1° to 10° smaller than the groove angles of said subgrooves provided on said ribs on said tread center side.

3. A pneumatic tire according to claim 1, wherein the groove angle of said subgrooves themselves each provided on said ribs is gradually decreased in going from the center side of the tire towards the shoulder side.

4. A pneumatic tire according to claim 1, wherein the groove widths, depths, and angles of individual main grooves are respectively substantially identical to each other.

* * * * *